United States Patent
Yoshimune et al.

(10) Patent No.: US 10,456,751 B2
(45) Date of Patent: Oct. 29, 2019

(54) METHOD FOR PRODUCING HOLLOW FIBER CARBON MEMBRANE AND SEPARATION MEMBRANE MODULE

(71) Applicant: NATIONAL INSTITUTE OF ADVANCED INDUSTRIAL SCIENCE AND TECHNOLOGY, Tokyo (JP)

(72) Inventors: Miki Yoshimune, Ibaraki (JP); Kenji Haraya, Ibaraki (JP); Nobuo Hara, Ibaraki (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 178 days.

(21) Appl. No.: 15/562,150

(22) PCT Filed: Mar. 2, 2016

(86) PCT No.: PCT/JP2016/056497
§ 371 (c)(1),
(2) Date: Sep. 27, 2017

(87) PCT Pub. No.: WO2016/158183
PCT Pub. Date: Oct. 6, 2016

(65) Prior Publication Data
US 2018/0078907 A1    Mar. 22, 2018

(30) Foreign Application Priority Data
Mar. 27, 2015    (JP) .................... 2015-067385

(51) Int. Cl.
*B01D 67/00*   (2006.01)
*B01D 63/02*   (2006.01)
(Continued)

(52) U.S. Cl.
CPC ....... *B01D 67/0067* (2013.01); *B01D 53/228* (2013.01); *B01D 63/02* (2013.01);
(Continued)

(58) Field of Classification Search
CPC .. B01D 53/228; B01D 67/0067; B01D 69/08; B01D 71/021; B01D 71/52; B01D 2323/08
See application file for complete search history.

(56) References Cited

U.S. PATENT DOCUMENTS 5,288,304 A * 2/1994 Koros ............... B01D 53/228
                                                        95/45
2010/0212503 A1 * 8/2010 Yoshimune .......... B01D 53/22
                                                        96/10

(Continued)

FOREIGN PATENT DOCUMENTS

| JP | H 1-221518 | * 9/1989 | .............. D01F 9/12 |
| JP | H1221518 A |   9/1989 | |

(Continued)

OTHER PUBLICATIONS

Geiszler, Vincent C. et al., "Effects of Polyimide Pyrolysis Conditions on Carbon Molecular Sieve Membrane Properties", Ind. Eng. Chem. Res., 1986, 35, pp. 2999-3003. (Year: 1986).*

(Continued)

*Primary Examiner* — Jason M Greene
(74) *Attorney, Agent, or Firm* — Marshall, Gerstein & Borun LLP

(57) ABSTRACT

An object of the present invention is to provide a method capable of easily controlling the permeation rate and the selectivity of gas molecules, in a hollow fiber carbon membrane which can be used as a gas separation membrane. The present invention provides a method of producing a hollow fiber carbon membrane, the method including: a preparation
(Continued)

step of preparing a precursor made of an organic polymer compound in the form of a hollow fiber; a preheating step of heating the precursor to a temperature of 150° C. to 400° C. in an atmosphere containing an oxygen gas; and a carbonization step of heating the precursor which has been subjected to the preheating step to a temperature of 450° C. to 850° C., thereby carbonizing the precursor; wherein the carbonization step includes heating the precursor in the presence of a hydrocarbon gas which may contain a nitrogen atom and which has from 1 to 8 carbon atoms. This method allows for easily controlling the permeation rate and the selectivity of gas molecules, in the resulting hollow fiber carbon membrane.

20 Claims, 3 Drawing Sheets

(51) Int. Cl.
  *B01D 69/08* (2006.01)
  *B01D 53/22* (2006.01)
  *B01D 71/02* (2006.01)
  *D01D 5/24* (2006.01)
  *D01F 6/76* (2006.01)
  *D01F 9/24* (2006.01)

(52) U.S. Cl.
  CPC .......... *B01D 63/021* (2013.01); *B01D 69/08* (2013.01); *B01D 71/021* (2013.01); *D01D 5/24* (2013.01); *D01F 6/76* (2013.01); *D01F 9/24* (2013.01); *B01D 2053/224* (2013.01); *B01D 2256/16* (2013.01); *B01D 2256/245* (2013.01); *B01D 2257/102* (2013.01); *B01D 2257/504* (2013.01); *Y02C 10/10* (2013.01); *Y02P 70/621* (2015.11)

(56) References Cited

U.S. PATENT DOCUMENTS

2013/0152793 A1* 6/2013 Bhuwania ............ B01D 53/228
  96/4
2016/0184775 A1* 6/2016 Chevrel ............ B01D 67/0067
  95/45

FOREIGN PATENT DOCUMENTS

| JP | 2002-355538 | * | 12/2002 | ............ B01D 69/08 |
| JP | 2002355538 A | | 12/2002 | |
| JP | 2006-231095 | * | 9/2006 | ............ B01D 71/02 |
| JP | 2006231095 A | | 9/2006 | |
| JP | 2009-34614 | * | 2/2009 | ............ B01D 71/02 |
| JP | 200934614 A | | 2/2009 | |
| JP | 2012-81375 | * | 4/2012 | ............ B01D 71/02 |
| JP | 2012081375 A | | 4/2012 | |

OTHER PUBLICATIONS

English language machine translation of JP 2002-235538. Retrieved from https://worldwide.espacenet.com on May 20, 2019. (Year: 2019).*
International Preliminary Report on Patentability in International Application No. PCT/JP2016/056497 dated Oct. 12, 2017, 8 pages.
International Search Report, corresponding International Application No. PCT/JP2016/056497, dated Apr. 19, 2016.

* cited by examiner a: Outer pipe of double-pipe nozzle , b: Inner pipe of double-pipe nozzle

METHOD FOR PRODUCING HOLLOW FIBER CARBON MEMBRANE AND SEPARATION MEMBRANE MODULE

TECHNICAL FIELD

The present invention relates to a method of producing a hollow fiber carbon membrane, and a separation membrane module. More specifically, the present invention relates to: a method of producing a hollow fiber carbon membrane which can be used as a gas separation membrane, and in which a permeation rate and a selectivity of gas molecules can be easily controlled; and a separation membrane module including the hollow fiber carbon membrane.

BACKGROUND ART

Carbon membranes, among various types of inorganic membranes, exhibit an excellent gas separation performance, and can be used in an environment where organic membranes cannot be used and heat resistance and chemical resistance are required. Therefore, the practical application thereof is expected. Further, hollow fiber membranes have an excellent pressure resistance and a large membrane area per unit volume, and thus have characteristics that they can be used to produce separation membrane modules which are more compact than those produced with flat membranes or spiral membranes.

Hollow fiber carbon membranes have been reported to have problems such as membrane fragility, sealing difficulty, and cost. In order to solve these problems, there have been proposed: a hollow fiber carbon membrane in which an inexpensive polyphenylene oxide derivative is used for forming a precursor (see Patent Document 1); a flexible hollow fiber carbon membrane in which a sulfonated polyphenylene oxide derivative is used for forming a precursor (see Patent Document 2), and the like.

PRIOR ART DOCUMENTS

Patent Documents

Patent Document 1: JP 2006-231095 A
Patent Document 2: JP 2009-034614 A

SUMMARY OF THE INVENTION

Problems to be Solved by the Invention

Hydrogen gas used in the field of fuel cells and the like are required to have a particularly high purity. In order to efficiently produce such a gas, a technique is required which allows for accurately controlling the permeability and the selectivity of gases, in a separation membrane used in the purification.

An object of the present invention is to provide a method of producing a hollow fiber carbon membrane which can be used as a gas separation membrane, and in which a permeation rate and a selectivity of gas molecules can be easily controlled.

Means for Solving the Problems

The present inventors have found out, as a result of intensive studies in order to solve the above mentioned problems, that by heating a precursor in the presence of a specific hydrocarbon gas, when carrying out the carbonization of the precursor, it is possible to easily control a permeation rate and a selectivity of gas molecules, in the resulting hollow fiber carbon membrane, and thereby completing the present invention.

In other words, the present invention is as follows.

<1> A method of producing a hollow fiber carbon membrane, the method including:

a preparation step of preparing a precursor made of an organic polymer compound in the form of a hollow fiber;

a preheating step of heating the precursor to a temperature of 150° C. to 400° C. in an atmosphere containing an oxygen gas; and a carbonization step of heating the precursor which has been subjected to the preheating step to a temperature of 450° C. to 850° C., thereby carbonizing the precursor;

wherein the carbonization step includes heating the precursor in the presence of a hydrocarbon gas which may contain a nitrogen atom and which has from 1 to 8 carbon atoms.

<2> The method of producing a hollow fiber carbon membrane according to <1>, wherein the hydrocarbon gas is a hydrocarbon containing a carbon-carbon unsaturated bond.

<3> The method of producing a hollow fiber carbon membrane according to <1> or <2>, wherein the organic polymer compound includes at least one selected from the group consisting of polyphenylene oxide, and a polyphenylene oxide derivative containing structures represented by the following formulae (a) and (b):

[Chem. 1]

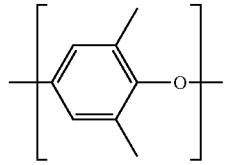
(a)

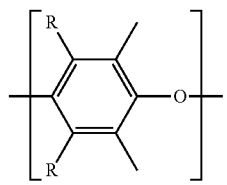
(b)

(wherein in the formula (b), each of Rs independently represents a hydrogen atom, —SO$_3$H, or —SO$_3$NH$_4$, with the proviso that Rs are not simultaneously hydrogen atoms).

<4> The method of producing a hollow fiber carbon membrane according to any one of <1> to <3>, wherein the method is a method of producing a hollow fiber carbon membrane which satisfies the following condition:

[condition]: the radius (bend radius) of a column which does not cause the hollow fiber carbon membrane to break, when the hollow fiber carbon membrane is wound about the column over an arc of 180° or more, is 5 mm or less.

<5> A separation membrane module including a hollow fiber carbon membrane produced by the method of producing a hollow fiber carbon membrane according to any one of <1> to <4>.

Effect of the Invention

According to the present invention, it is possible to easily control the permeation rate and the selectivity of gas molecules in the hollow fiber carbon membrane.

MODE FOR CARRYING OUT THE INVENTION

The present invention will now be described in detail, with reference to specific examples. However, the present invention is not limited to the following description as long as the gist of the present invention is not deviated, and modifications can be made thereto as appropriate.

<Method for Producing Hollow Fiber Carbon Membrane>

A method of producing a hollow fiber carbon membrane, which is one aspect of the present invention (hereinafter, sometimes abbreviated as the "production method of the present invention") includes: a preparation step of preparing a precursor made of an organic polymer compound in the form of a hollow fiber (hereinafter, sometimes abbreviated as the "preparation step"); a preheating step of heating the precursor to a temperature of 150° C. to 400° C. in an atmosphere containing an oxygen gas (hereinafter, sometimes abbreviated as the "preheating step"); and a carbonization step of heating the precursor which has been subjected to the preheating step to a temperature of 450° C. to 850° C., thereby carbonizing the precursor (hereinafter, sometimes abbreviated as the "carbonization step"); and the method is characterized in that the carbonization step includes heating the precursor in the presence of a hydrocarbon gas which may contain a nitrogen atom and which has from 1 to 8 carbon atoms.

The present inventors have made intensive studies in order to improve the permeation rate and the selectivity of gas molecules in a hollow fiber carbon membrane. As a result, the inventors have discovered that, by heating a precursor in the presence of a specific hydrocarbon gas, when carrying out the carbonization of the precursor, and thereby forming a new carbide layer on the surface thereof, it is possible to easily control the permeation rate and the selectivity of gas molecules, in the resulting hollow fiber carbon membrane.

Figure 1:
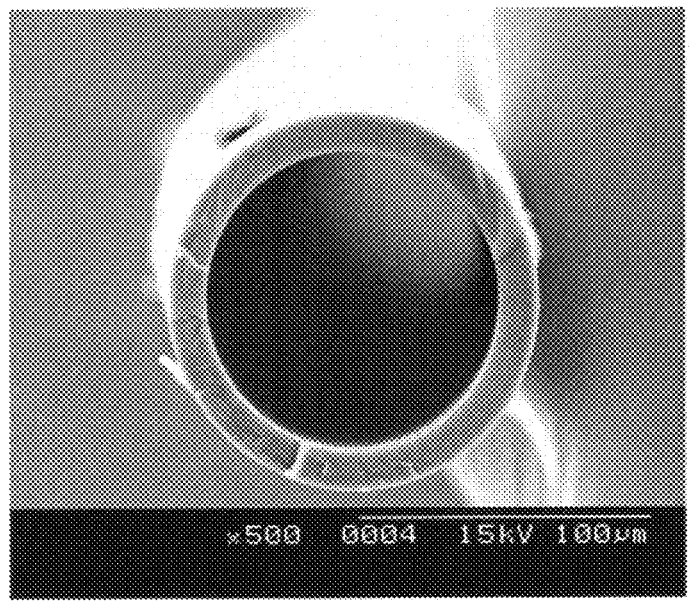
FIG. 1 is a photograph (drawing substitute photograph) showing a cross section of a hollow fiber carbon membrane obtained by a scanning electron microscope (SEM).

The "hollow fiber carbon membrane" as used herein refers to a carbon (simple substance) material having the shape of a hollow fiber membrane (straw-like shape) (see FIG. 1), and details thereof, such as inclusion of impurities, crystal structure and the like, are not particularly limited, as long as the hollow fiber carbon membrane is composed mainly of carbon.

The "preparation step", the "preheating step", and the "carbonization step" will be described below in detail.

(Preparation Step)

The preparation step is a step of preparing a precursor made of an organic polymer compound in the form of a hollow fiber. The method of preparing the precursor, the type of organic polymer compound, the size of the precursor, the method of forming the precursor, and the like are not particularly limited, and those publicly known may be selected as appropriate. Details will be described below with reference to specific examples.

Examples of the method of preparing the precursor include a method of forming the precursor from scratch, or a method of acquiring the precursor. The method of forming the precursor will be described later.

The organic polymer compound may be a synthetic polymer compound such as polyphenylene oxide or polyimide, or a natural polymer compound such as cellulose, as long as it is a polymer compound having a carbon skeleton. However, the organic polymer compound is preferably a synthetic polymer compound.

The synthetic polymer compound may be, for example, polyphenylene oxide, or a polyphenylene oxide derivative containing structures represented by the following formulae (a) and (b) (hereinafter, sometimes abbreviated as the "polyphenylene oxide derivative"):

[Chem. 2]

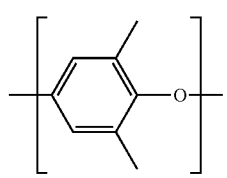
(a)

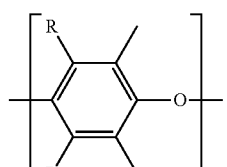
(b)

(wherein in the formula (b), each of Rs independently represents a hydrogen atom, —SO$_3$H, or —SO$_3$NH$_4$, with the proviso that Rs are not simultaneously hydrogen atoms).

Among these, a polyphenylene oxide derivative containing structures represented by the formulae (a) and (b) is particularly preferred. When the polyphenylene oxide derivative is used as the organic polymer compound, a flexible hollow fiber carbon membrane having an excellent bending strength can be produced.

The ratio of the structure represented by the formula (b) in the polyphenylene oxide derivative (amount of substance of the structure represented by the formula (b)/(amount of substance of the structure represented by the formula (a)+ amount of substance of the structure represented by the formula (b))×100) is usually 15% or more, preferably 18% or more, and more preferably 20% or more, and the ratio is usually 60% or less, preferably 40% or less, and more preferably 35% or less.

The molecular weight of the organic polymer compound should be selected as appropriate depending on the type thereof. In the case of using polyphenylene oxide or the polyphenylene oxide derivative as the organic polymer compound, the weight average molecular weight ($M_w$) thereof is usually 5,000 or more, preferably 10,000 or more, and more preferably 20,000 or more, and the weight average molecular weight ($M_w$) is the usually 1,000,000 or less, preferably 900,000 or less, and more preferably 800,000 or less.

The precursor is formed in the shape of a hollow fiber, and the outer diameter of the hollow fiber is usually 0.2 mm or more, preferably 0.22 mm or more, and more preferably 0.25 mm or more, and the outer diameter is usually 0.5 mm or less, preferably 0.4 mm or less, and more preferably 0.35 mm or less. The inner diameter of the hollow fiber is usually 0.18 mm or more, preferably 0.2 mm or more, and more preferably 0.23 mm or more, and the inner diameter is usually 0.48 mm or less, preferably 0.38 mm or less, and more preferably 0.33 mm or less.

Figure 2:
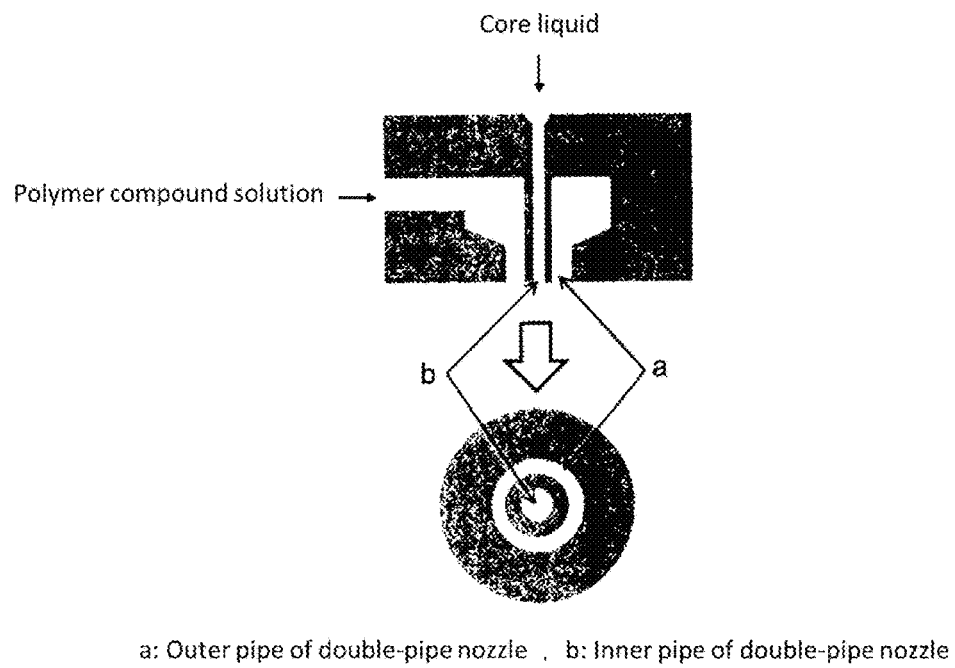
FIG. 2 is a schematic diagram showing a hollow fiber spinning nozzle having a double-pipe structure, which can be used for forming a precursor in the form of a hollow fiber.

Examples of the method of forming the precursor include a method which uses a hollow fiber spinning nozzle having a double-pipe structure, such as one shown in FIG. 2. Specifically, it is a method in which the organic polymer compound which has been dissolved or melted is extruded through the outer pipe of the double pipe, and simultaneously, a solvent which does not dissolve the organic polymer compound, as a core liquid, is extruded through the inner pipe of the double pipe.

A solvent to be used for dissolving the organic polymer compound should be selected as appropriate depending on the type of the organic polymer compound. Examples of the solvent, in the case of using the polyphenylene oxide derivative as the organic polymer compound, include methanol, ethanol, tetrahydrofuran, N,N-dimethylacetamide, N-methyl-2-pyrrolidone, and the like.

A solvent to be used for a coagulation bath or as a core liquid is not particularly limited, as long as the solvent does not dissolve the organic polymer compound. Examples of the solvent, in the case of using the polyphenylene oxide derivative as the organic polymer compound, include water, an aqueous solution of an ammonium salt, and the like. Examples of the ammonium salt to be used in the aqueous solution of an ammonium salt include ammonium nitrate, ammonium hydrochloride, ammonium sulfate, and the like. The temperature of the core liquid and of the coagulation bath is from −20° C. to 60° C., and preferably 0° C. to 30° C.

(Preheating Step)

The preheating step is a step of heating the precursor to a temperature of 150° C. to 400° C. in an atmosphere containing an oxygen gas. The concentration of the oxygen gas, a heating apparatus, the heating temperature, the heating time, and the like to be used in the step are not particularly limited, and those publicly known may be selected as appropriate. Details will be described below with reference to specific examples.

The atmosphere containing an oxygen gas may be, for example, air. The concentration of the oxygen gas is usually 1% by volume or more, preferably 5% by volume or more, and more preferably 10% by volume or more, and the concentration is usually 100% by volume or less, preferably 50% by volume or less, and more preferably 30% by volume or less.

The heating apparatus may be any apparatus capable of heating up to about 400° C. Since heating is carried out in an atmosphere containing an oxygen gas, the interior of the apparatus need not be a sealed atmosphere. The heating apparatus may be, for example, a muffle furnace.

The heating temperature is from 150° C. to 400° C., and it is preferably 250° C. or higher, and more preferably 280° C. or higher, and the heating temperature is preferably 350° C. or lower, and more preferably 320° C. or lower.

The heating time is usually 10 minutes or more, preferably 30 minutes or more, and more preferably one hour or more, and the heating time is usually four hours or less, preferably three hours or less, and more preferably two hours or less.

When the heating time is within the above described range, the melting of the precursor and the like can be prevented, and the production of a hollow fiber carbon membrane having a good quality can be facilitated.

(Carbonization Step)

The carbonization step is a step of heating the precursor which has been subjected to the preheating step to a temperature of 450° C. to 850° C., thereby carbonizing the precursor. An atmosphere gas, a heating apparatus, the heating temperature, the heating time, and the like to be used in the step is not particularly limited, and those publicly known may be selected as appropriate. Details will be described below with reference to specific examples.

In the carbonization step, heating is usually carried out in an atmosphere which does not contain any substance capable of oxidizing carbon, in order to "carbonize" the precursor. Specifically, heating may be carried out, for example, in an atmosphere of an inert gas.

Examples of the inert gas include nitrogen gas, helium gas, argon gas, and the like.

Figure 3:
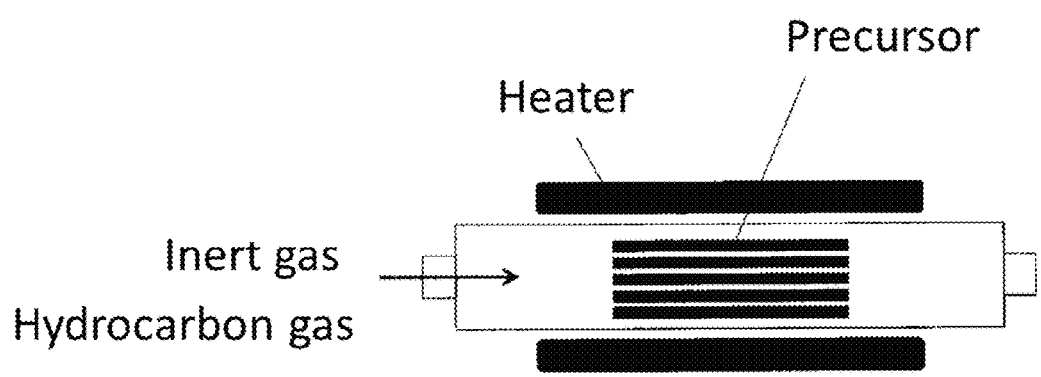
FIG. 3 is a schematic diagram showing an apparatus which can be used in the carbonization step in the present invention.

Since heating is carried out in an atmosphere which does not contain any substance capable of oxidizing carbon, the heating apparatus may be, for example, an apparatus capable of heating a sealable batch reactor, or a continuous reactor into and from which an inert gas or the like can be continuously supplied and discharged, from the exterior of the reactor. In particular, preferred is a heating apparatus capable of heating a continuous tubular reactor from the exterior of the reactor such as one shown in FIG. 3.

The heating temperature is from 450° C. to 850° C., and it is preferably 550° C. or higher, and more preferably, 600° C. or higher, and the heating temperature is preferably 750° C. or lower, and more preferably 700° C. or lower.

The heating time is usually five minutes or more, preferably 10 minutes or more, and more preferably 20 minutes or more, and still more preferably 30 minutes or more, and the heating time is usually four hours or less, preferably two hours or less, and more preferably one hour or less.

The carbonization step is characterized by including heating the precursor in the presence of a hydrocarbon gas which may contain a nitrogen atom and which has from 1 to 8 carbon atoms (hereinafter, sometimes abbreviated as the "hydrocarbon gas"). The expression "may contain a nitrogen atom" means that the hydrocarbon gas may contain, a functional group containing a nitrogen atom, such as a primary amino group (—NH$_2$) or a cyano group (—CN), and in addition, in its carbon skeleton, a functional group containing a nitrogen atom, such as a secondary amino group (—NH—). Further, the hydrocarbon gas is not limited to one containing a linear saturated hydrocarbon group, and may be one containing any of a carbon-carbon unsaturated bond, a branched structure, and a ring structure. In particular, the hydrocarbon gas is preferably a hydrocarbon containing a carbon-carbon unsaturated bond. When a hydrocarbon containing a carbon-carbon unsaturated bond is used, it is possible to more easily control the permeation rate and the selectivity of gas molecules, in the resulting hollow fiber carbon membrane.

The hydrocarbon gas preferably has six or less carbon atoms, more preferably four or less carbon atoms, and particularly preferably three or less carbon atoms.

Examples of the hydrocarbon gas include methane, ethane, ethylene, acetylene, acetonitrile, n-propane, i-propane, propylene, n-butane, i-butane, 1-butene, 1,3-butadiene, n-hexane, cyclohexane, and the like. Among these, propylene or ethylene is particularly preferred.

The carbonization step is a step of heating the precursor which has been subjected to the preheating step to a temperature of 450° C. to 850° C., thereby carbonizing the precursor, wherein the step includes heating the precursor in the presence of the hydrocarbon gas. Examples of specific embodiments include an embodiment in which the precursor which has been subjected to the preheating step is heated to a temperature of 450° C. to 850° C., while supplying an inert gas and the hydrocarbon gas, thereby carbonizing the precursor. The temperature elevation before starting the carbonization step and the temperature lowering after the completion of the carbonization step are both usually carried out in an inert gas atmosphere. However, the elevation and lowering of the temperature may also be carried out while supplying an inert gas and the hydrocarbon gas. Further, an inert gas and the hydrocarbon gas need not be supplied simultaneously at all times, and examples of the method of supplying the gases include supply methods 1 to 6 shown in the following Table 1.

TABLE 1

| | | During temperature elevation | First half of carbonization step | Second half of carbonization step | During temperature lowering |
|---|---|---|---|---|---|
| Supply method 1 | Supply of inert gas | ○ | ○ | ○ | ○ |
| | Supply of hydrocarbon gas | ○ | ○ | ○ | ○ |
| Supply method 2 | Supply of inert gas | ○ | ○ | ○ | ○ |
| | Supply of hydrocarbon gas | X | X | ○ | ○ |
| Supply method 3 | Supply of inert gas | ○ | ○ | ○ | ○ |
| | Supply of hydrocarbon gas | X | ○ | ○ | X |
| Supply method 4 | Supply of inert gas | ○ | X | X | ○ |
| | Supply of hydrocarbon gas | X | ○ | ○ | X |
| Supply method 5 | Supply of inert gas | ○ | ○ | ○ | ○ |
| | Supply of hydrocarbon gas | X | X | ○ | X |
| Supply method 6 | Supply of inert gas | ○ | ○ | X | ○ |
| | Supply of hydrocarbon gas | X | X | ○ | X |

Among these, the supply method 3, and the supply method 5 are particularly preferred.

In the case of supplying an inert gas and the hydrocarbon gas simultaneously, the concentration of the hydrocarbon gas (volume flow rate of hydrocarbon gas/volume flow rate of inert gas×100 [% by volume]) is usually 1% by volume or more, preferably 5% by volume or more, and more preferably 10% by volume or more, and the concentration of the hydrocarbon gas is usually 100% by volume or less, preferably 50% by volume or less, and more preferably 20% by volume or less.

Figure 4:
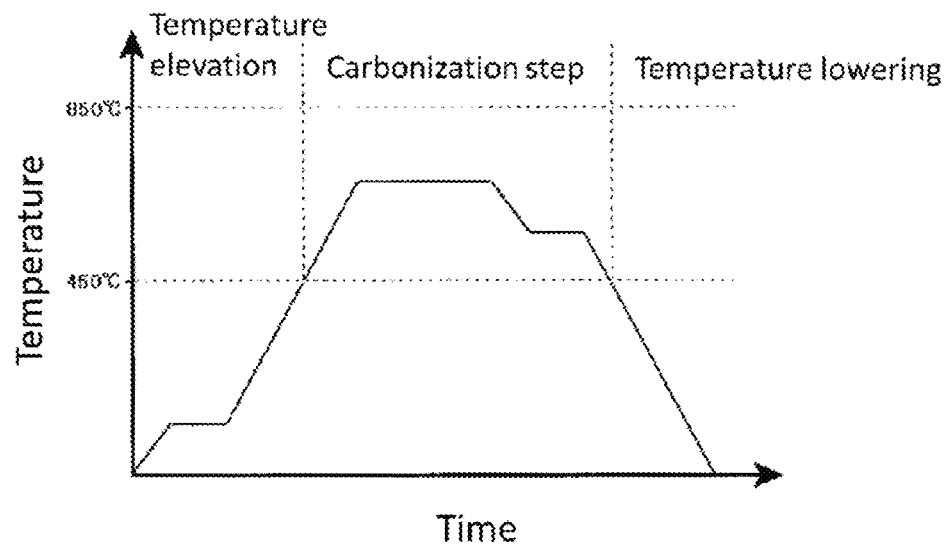
FIG. 4 is a graph showing an example of changes over time in the temperature, in the carbonization step in the present invention.

The heating temperature in the carbonization step may be varied during the step, as shown in FIG. 4. Examples of the combination of the heating temperatures include: an embodiment in which the temperature is changed from the range of 450° C. to 650° C. (in the first half of the carbonization step) to the range of 600° C. to 750° C. (in the second half of the carbonization step), and an embodiment in which the temperature is changed from the range of 650° C. to 750° C. (in the first half of the carbonization step) to the range of 500° C. to 650° C. (in the second half of the carbonization step).

The heating temperature during the period in which the hydrocarbon gas is supplied, is preferably 550° C. or higher, and more preferably 650° C. or higher, and the heating temperature is preferably 800° C. or lower, and more preferably 750° C. or lower.

The supply time during which the hydrocarbon gas is supplied is usually two minutes or more, preferably five minutes or more, and more preferably 10 minutes or more, and the supply time is usually one hour or less, preferably 30 minutes or less, and more preferably 20 minutes or less.

The production method of the present invention is not particularly limited, as long as the method includes the above described preparation step, preheating step, and carbonization step. The method may further include any of known steps, such as, for example, a post treatment step of heating the hollow fiber carbon membrane obtained in the carbonization step to a temperature of 150° C. to 300° C. For example, by including the post treatment step, it is possible to improve the flexibility of the resulting hollow fiber carbon membrane.

The physical properties and the dimensions of the hollow fiber carbon membrane produced by the production method of the present invention are not particularly limited; however, the hollow fiber carbon membrane preferably satisfies the following condition.

[Condition]: The radius (bend radius) of a column which does not cause the hollow fiber carbon membrane to break, when the hollow fiber carbon membrane is wound about the column over an arc of 180° or more, is 5 mm or less.

The bend radius of the hollow fiber carbon membrane is preferably 10 mm or less, more preferably 7 mm or less, and still more preferably 5 mm or less, and the bend radius is usually 2 mm or more.

When a hollow fiber carbon membrane with a bend radius within the above range is used for producing a membrane module, which is obtained by compactly filling the hollow fiber carbon membranes within a container, it is possible to reduce the damage of the membranes in the production of the membrane module.

The outer diameter of the hollow fiber carbon membrane is usually 0.08 mm or more, preferably 0.1 mm or more, and more preferably 0.15 mm or more, and the outer diameter is usually 0.5 mm or less, preferably 0.35 mm or less, and more preferably 0.25 mm or less. The inner diameter of the hollow fiber carbon membrane is usually 0.06 mm or more, preferably 0.08 mm or more, and more preferably 0.13 mm or more, and the inner diameter is usually 0.48 mm or less, preferably 0.33 mm or less, and more preferably 0.23 mm or less.

The application of the hollow fiber carbon membrane produced by the production method of the present invention is not particularly limited, but it is useful as a gas separation membrane. Examples of the combination of gases to be separated include: helium gas (He) and nitrogen gas ($N_2$); hydrogen gas ($H_2$) and nitrogen gas ($N_2$); carbon dioxide gas ($CO_2$) and nitrogen gas ($N_2$); oxygen gas ($O_2$) and nitrogen gas ($N_2$); hydrogen gas ($H_2$) and methane gas ($CH_4$); carbon dioxide gas ($CO_2$) and methane gas ($CH_4$); nitrogen gas ($N_2$) and methane gas ($CH_4$); helium gas (He) and methane gas ($CH_4$); and the like.

<Separation Membrane Module>

As described above, the production method of the present invention is a method which allows for easily controlling the permeation rate and the selectivity of gas molecules, in the resulting hollow fiber carbon membrane. In addition, a separation membrane module including the hollow fiber carbon membrane produced by the production method of the present invention (hereinafter, sometimes abbreviated as the "separation membrane module of the present invention") is also an aspect of the present invention.

The specific structure of the separation membrane module of the present invention, the number of the hollow fiber carbon membranes included therein, and the like, are not particularly limited, and they may be selected as appropriate depending on the purpose. Details will be described below with reference to specific examples.

Figure 5:
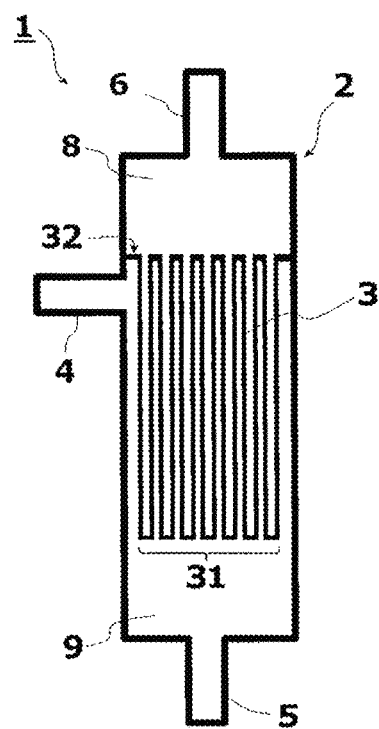
FIG. 5 is a schematic diagram showing an example of a separation membrane module including a hollow fiber carbon membrane produced by the method of producing a hollow fiber carbon membrane according to the present invention.

The separation membrane module of the present invention may be, for example, one having a structure shown in FIG. 5.

A separation membrane module 1 shown in FIG. 5 includes a container 2 and a separation membrane element 3.

The separation membrane element 3 includes: a separation membrane unit 31 consisting of a plurality of hollow fiber carbon membranes (separation membranes) formed into a bundle; and a fixing unit 32 fixing one end of the separation membrane unit 31; and is disposed such that the inner space within the container 2 is divided into a first space 8 and a second space 9. The hollow fiber carbon membranes are structured such that one end thereof on the side of the fixing unit 32 forms an opening and the other end thereof is closed, and the opening is in communication with the first space 8. Accordingly, the first space 8 and the second space 9 are in communication with each other through the hollow fiber carbon membranes. The separation membrane element 3 is fixed to the container 2.

The container 2 includes a gas supply port 4, a gas discharge port 5, and a gas discharge port 6, and is in the shape of a cylinder in the present embodiment. The gas supply port 4 is provided for supplying substances to be supplied (such as a dehydrogenation reaction product) to the second space 9, and disposed at the peripheral surface of the container 2 in the present embodiment. The gas discharge port 5 is provided for discharging a non-permeated substance(s) (such as a dehydrogenated product) which has/have not permeated through the separation membrane unit 31 from the second space 9 to the exterior of the container 2, and it is disposed at one end portion of the container 2 in the present embodiment. The gas discharge port 6 is provided for discharging a permeated substance(s) (such as hydrogen molecules) which has/have permeated through the separation membrane unit 31 from the first space 8 to the exterior of the container 2, and it is disposed at the other end portion of the container 2 in the present embodiment.

The number of the hollow fiber carbon membranes included in the separation membrane module 1 is selected as appropriate depending on the performance of the hollow fiber carbon membranes or the amount of high-purity hydrogen required.

EXAMPLES

The present invention will now be described more specifically, with reference to Examples. However, alterations can be made as appropriate, as long as the gist of the present invention is not deviated. Accordingly, the scope of the present invention should not be interpreted restrictively by the specific examples given below.

Example 1

(Preparation Step)

A quantity of 8.0 g of sulfonated polyphenylene oxide in which the ratio of the structure represented by the formula (b) was 28% was dissolved in a mixed solution of 10.3 g of methanol and 10.3 g of N,N-dimethylacetamide, to obtain 28% by weight of an organic polymer compound solution. Using a hollow fiber spinning nozzle which has a double-pipe structure and which includes an outer pipe with an outer diameter of 0.4 mm and an inner diameter of 0.18 mm, the organic polymer compound solution obtained above was extruded through the outer pipe of the hollow fiber spinning nozzle, and simultaneously, a 20% by weight aqueous solution of ammonium nitrate, as a core liquid, was extruded through the inner pipe of the hollow fiber spinning nozzle, both into a water coagulation bath. The resultant was then air dried at room temperature, to prepare a precursor.

(Preheating Step)

The resulting precursor was placed in a muffle furnace, and the temperature in the furnace was elevated at a rate of 8° C./min up to 320° C., in an air atmosphere. The precursor was then heated at this temperature for one hour, and then left to cool.

(Carbonization Step)

Using a continuous tubular reactor, the precursor which had been preheated was then subjected to a carbonization treatment, while supplying a high-purity nitrogen gas as an inert gas at a flow rate of 3.0 liters/min. At this time, the operation was carried out as follows. First, the temperature was maintained at 120° C., and the precursor was subjected to a dehydration treatment for one hour, followed by elevating the temperature at a rate of 10° C./min up to 650° C. After carrying out heating at this temperature for 55 minutes, the supply of the nitrogen gas was terminated, and at the same time, the supply of a high-purity propylene gas (concentration of hydrocarbon gas: 100% by volume (propylene)) was started at a flow rate of 3.0 liters/min, and heating was carried out for five minutes. Subsequently, the supply of the propylene gas was terminated and the supply of the nitrogen gas was resumed. The precursor was then left to cool to obtain a hollow fiber carbon membrane (supply method 6).

Comparative Example 1

In the carbonization treatment, the temperature was first maintained at 120° C. and the dehydration treatment of the precursor was carried out for one hour, while supplying a high-purity nitrogen gas (concentration of hydrocarbon gas: 0% by volume) at a flow rate of 3.0 liters/min, followed by elevating the temperature at a rate of 10° C./min up to 650° C. The precursor was heated at this temperature for one hour, and then left to cool to obtain a hollow fiber carbon membrane.

Example 2

The same operation as in Example 1 was carried out except that an industrial propylene gas (propylene concentration: 76% by volume) was used instead of the high-purity propylene gas (concentration of hydrocarbon gas: 76 to 100% by volume (propylene etc.)), to obtain a hollow fiber carbon membrane. Note that, an impurity(ies) contained in the industrial propylene is/are a hydrocarbon compound(s) such as propane, and the concentration of water in the industrial propylene is 1,000 PPM or less.

Example 3

The same operation as in Example 1 was carried out except that a high-purity ethylene gas (concentration of hydrocarbon gas: 100% by volume (ethylene)) was used instead of the high-purity propylene gas, to obtain a hollow fiber carbon membrane.

Example 4

In the carbonization treatment, the temperature was first maintained at 120° C. and the dehydration treatment of the precursor was carried out for one hour, while supplying a high-purity nitrogen gas at a flow rate of 3.0 liters/min, followed by elevating the temperature at a rate of 10° C./min up to 650° C. Then the supply was switched from the nitrogen gas to a mixed gas of 14% by volume of acetonitrile/nitrogen (concentration of hydrocarbon gas: 14% by volume (acetonitrile)), and the mixed gas was supplied at a flow rate of 3.4 liters/min. The precursor was then heated at this temperature for one hour. Subsequently, the supply of the mixed gas of acetonitrile and nitrogen was terminated, and the supply of the nitrogen gas was resumed. The precursor was then left to cool, to obtain a hollow fiber carbon membrane (supply method 3).

Example 5

The same operation as in Example 4 was carried out except that a mixed gas of 16% by volume of cyclohexane/nitrogen (concentration of hydrocarbon gas: 16% by volume (cyclohexane)) was used instead of the mixed gas of 14% by volume of acetonitrile/nitrogen, to obtain a hollow fiber carbon membrane.

Example 6

In the carbonization treatment, the temperature was first maintained at 120° C. and the dehydration treatment of the precursor was carried out for one hour, while supplying a high-purity nitrogen gas at a flow rate of 3.0 liters/min, followed by elevating the temperature at a rate of 10° C./min up to 650° C. The precursor was heated at this temperature for one hour, and then the temperature was lowered at a rate of 10° C./min down to 600° C. Then the supply of the nitrogen gas was terminated, and at the same time, the supply of a high-purity propylene gas (concentration of hydrocarbon gas: 100% by volume (propylene)) was started at a flow rate of 3.0 liters/min, and heating was carried out for 10 minutes. Subsequently, the supply of the propylene gas was terminated and the supply of the nitrogen gas was resumed. The precursor was then left to cool, to obtain a hollow fiber carbon membrane (supply method 6).

Example 7

In the carbonization treatment, the temperature was first maintained at 120° C. and the dehydration treatment of the precursor was carried out for one hour, while supplying a high-purity nitrogen gas at a flow rate of 3.0 liters/min, followed by elevating the temperature at a rate of 20° C./min up to 700° C. The precursor was heated at this temperature for 15 minutes. Then the supply of the nitrogen gas was terminated, and at the same time, the supply of a high-purity propylene gas (concentration of hydrocarbon gas: 100% by volume (propylene)) was started at a flow rate of 3.0 liters/min, and heating was carried out for five minutes. Subsequently, the supply of the propylene gas was terminated and the supply of the nitrogen gas was resumed. The precursor was then left to cool, to obtain a hollow fiber carbon membrane (supply method 6).

Comparative Example 2

In the carbonization treatment, the temperature was first maintained at 120° C. and the dehydration treatment of the precursor was carried out for one hour, while supplying a high-purity nitrogen gas (concentration of hydrocarbon gas: 0% by volume) at a flow rate of 3.0 liters/min, followed by elevating the temperature at a rate of 20° C./min up to 700° C. The precursor was heated at this temperature for 20 minutes, and then left to cool to obtain a hollow fiber carbon membrane.

Example 8

In the carbonization treatment, the temperature was first maintained at 120° C. and the dehydration treatment of the precursor was carried out for one hour, while supplying a high-purity nitrogen gas at a flow rate of 3.0 liters/min, followed by elevating the temperature at a rate of 20° C./min up to 700° C. Then the supply was switched from the nitrogen gas to a mixed gas of 10% by volume of propylene/nitrogen (concentration of hydrocarbon gas: 10% by volume (propylene)), and the mixed gas was supplied at a flow rate of 3.0 liters/min. The precursor was then heated at this temperature for 20 minutes. Subsequently, the supply of the mixed gas of propylene and nitrogen was terminated, and the supply of the nitrogen gas was resumed. The precursor was then left to cool, to obtain a hollow fiber carbon membrane (supply method 3).

Example 9

The same operation as in Example 8 was carried out except that a mixed gas of 5% by volume of propylene/nitrogen (concentration of hydrocarbon gas: 5% by volume (propylene)) was used instead of the mixed gas of 10% by volume of propylene/nitrogen, to obtain a hollow fiber carbon membrane.

Example 10

In the carbonization treatment, the temperature was first maintained at 120° C. and the dehydration treatment of the precursor was carried out for one hour, while supplying a high-purity nitrogen gas at a flow rate of 3.0 liters/min, followed by elevating the temperature at a rate of 20° C./min up to 700° C. After heating the precursor at this temperature for 10 minutes, the supply was switched from the nitrogen gas to a mixed gas of 10% by volume of propylene/nitrogen (concentration of hydrocarbon gas: 10% by volume (propylene)), and the mixed gas was supplied at a flow rate of 3.0 liters/min. The heating was performed at this temperature for another 10 minutes. Subsequently, the supply of the mixed gas of propylene and nitrogen was terminated, and the supply of the nitrogen gas was resumed. The precursor was then left to cool, to obtain a hollow fiber carbon membrane (supply method 5).

Example 11

The same operation as in Example 10 was carried out except that a mixed gas of 20% by volume of propylene/nitrogen (concentration of hydrocarbon gas: 20% by volume (propylene)) was used instead of the mixed gas of 10% by volume of propylene/nitrogen, to obtain a hollow fiber carbon membrane.

Example 12

The same operation as in Example 10 was carried out except that a mixed gas of 5% by volume of propylene/nitrogen (concentration of hydrocarbon gas: 5% by volume (propylene)) was used instead of the mixed gas of 10% by volume of propylene/nitrogen, to obtain a hollow fiber carbon membrane.

Example 13

In the carbonization treatment, the temperature was first maintained at 120° C. and the dehydration treatment of the precursor was carried out for one hour, while supplying a high-purity nitrogen gas at a flow rate of 3.0 liters/min, followed by elevating the temperature at a rate of 20° C./min up to 700° C. Then the supply was switched from the nitrogen gas to a mixed gas of 16% by volume of cyclohexane/nitrogen (concentration of hydrocarbon gas: 16% by volume (cyclohexane)), and the mixed gas was supplied at a flow rate of 3.4 liters/min. The precursor was then heated at this temperature for 20 minutes. Subsequently, the supply of the mixed gas of cyclohexane and nitrogen was terminated, and the supply of the nitrogen gas was resumed. The precursor was then left to cool, to obtain a hollow fiber carbon membrane (supply method 3).

Example 14

In the carbonization treatment, the temperature was first maintained at 120° C. and the dehydration treatment of the precursor was carried out for one hour, while supplying a high-purity nitrogen gas at a flow rate of 3.0 liters/min, followed by elevating the temperature at a rate of 20° C./min up to 750° C. After heating the precursor at this temperature for five minutes, the supply was switched from the nitrogen gas to a mixed gas of 10% by volume of propylene and nitrogen (concentration of hydrocarbon gas: 10% by volume (propylene)), and the mixed gas was supplied at a flow rate of 3.0 liters/min. The heating was performed at this temperature for another five minutes. Subsequently, the supply of the mixed gas of propylene and nitrogen was terminated, and the supply of the nitrogen gas was resumed. The precursor was then left to cool, to obtain a hollow fiber carbon membrane (supply method 5).

<Evaluation of Gas Separation Performance of Hollow Fiber Carbon Membrane>

The gas separation performance of each of the hollow fiber carbon membranes obtained in Examples 1 to 14 and Comparative Examples 1 and 2 was evaluated, using test gases (He, $H_2$, $CO_2$, $O_2$, $N_2$, and $CH_4$). The evaluation method is as follows.

To an external surface of a hollow fiber module set in a gas permeation rate measuring apparatus for hollow fibers, a test gas was supplied at 90° C. and at a constant pressure, and the flow rate of the gas permeating through the hollow fiber module was measured with a flowmeter. The gas separation performance was evaluated, based on the gas permeation rate Q obtained according to the following equation.

Q=gas permeation flow rate $(cm^3 \cdot STP)$/{membrane area $(cm^2)$×time (sec)×pressure difference (cmHg)}

The unit is $cm^3$ $(STP)/(cm^2 \cdot sec \cdot cmHg)$.

The ideal separation factor $\alpha_{A/B}$ of the membrane of gas A to gas B was defined as the following equation, and indicates the selectivity of gas A to gas B.

$$\alpha_{A/B}=Q_A/Q_B$$

In the above described equation, $Q_A$ and $Q_B$ indicate the gas permeation rates of gas A and gas B, respectively.

The results are shown in Table 3.

<Evaluation of Flexibility of Membrane>

Each of the hollow fiber carbon membranes obtained in Examples 1 to 14 and Comparative Examples 1 and 2 was wound about columns varying in diameter, over an arc of 180° or more, and it was observed whether or not the hollow fiber membrane broke. Each column having the smallest radius among the columns which did not cause the hollow fiber membrane to break was determined. The smallest radius of the column was taken as the bend radius, and the flexibility of the membrane was evaluated based on the value of the bend radius.

As a result, all of the carbon membranes had a bend radius of 5 mm or less.

TABLE 2

|  | Temperature during the carbonization step | Time for carrying out the carbonization step | Hydrocarbon gas to be supplied | | Temperature of supplied hydrocarbon gas | Supply time during which hydrocarbon gas is supplied | Supply method |
| --- | --- | --- | --- | --- | --- | --- | --- |
|  |  |  | Type | Concentration |  |  |  |
| Example 1 | 650° C. | 1 hour | Propylene | 100% by volume | 650° C. | 5 minutes | Supply of propylene was started 55 minutes later |

TABLE 2-continued

| | Temperature during the carbonization step | Time for carrying out the carbonization step | Hydrocarbon gas to be supplied | | Temperature of supplied hydrocarbon gas | Supply time during which hydrocarbon gas is supplied | Supply method |
|---|---|---|---|---|---|---|---|
| | | | Type | Concentration | | | |
| Example 2 | 650° C. | 1 hour | Propylene etc. | 76-100% by volume | 650° C. | 5 minutes | Supply of propylene was started 55 minutes later |
| Example 3 | 650° C. | 1 hour | Ethylene | 100% by volume | 650° C. | 5 minutes | Supply of ethylene was started 55 minutes later |
| Example 4 | 650° C. | 1 hour | Acetonitrile | 14% by volume | 650° C. | 1 hour | Simultaneously supplied |
| Example 5 | 650° C. | 1 hour | Cyclohexane | 16% by volume | 650° C. | 1 hour | Simultaneously supplied |
| Example 6 | 650° C. | 1 hour and 10 minutes | Propylene | 100% by volume | 600° C. | 10 minutes | Supply of propylene was started after lowering the temperature to 600° C. |
| Example 7 | 700° C. | 20 minutes | Propylene | 100% by volume | 700° C. | 5 minutes | Supply of propylene was started 15 minutes later |
| Example 8 | 700° C. | 20 minutes | Propylene | 10% by volume | 700° C. | 20 minutes | Simultaneously supplied |
| Example 9 | 700° C. | 20 minutes | Propylene | 5% by volume | 700° C. | 20 minutes | Simultaneously supplied |
| Example 10 | 700° C. | 20 minutes | Propylene | 10% by volume | 700° C. | 10 minutes | Supply of propylene was started 10 minutes later |
| Example 11 | 700° C. | 20 minutes | Propylene | 20% by volume | 700° C. | 10 minutes | Supply of propylene was started 10 minutes later |
| Example 12 | 700° C. | 20 minutes | Propylene | 5% by volume | 700° C. | 10 minutes | Supply of propylene was started 10 minutes later |
| Example 13 | 700° C. | 20 minutes | Cyclohexane | 16% by volume | 700° C. | 20 minutes | Simultaneously supplied |
| Example 14 | 750° C. | 10 minutes | Propylene | 10% by volume | 750° C. | 5 minutes | Supply of propylene was started 5 minutes later |
| Comparative Example 1 | 650° C. | 1 hour | — | 0% by volume | — | — | |
| Comparative Example 2 | 700° C. | 20 minutes | — | 0% by volume | — | — | |

*"Time for carrying out the carbonization step" refers to the duration of the carbonization step excluding the period of time during which the temperature is elevated and the period of time during which the temperature is lowered.

TABLE 3

| | Permeation rate Q(measured at 90° C.) $10^{-6}$ cm$^2$ (STP)/(cm$^2$s cmHg) | | | | Ideal separation factor $\alpha_{A/B}$ | | |
|---|---|---|---|---|---|---|---|
| | $H_2$ | $CO_2$ | $N_2$ | $CH_4$ | $H_2/N_2$ | $H_2/CH_4$ | $CO_2/CH_4$ |
| Example 1 | 44.7 | 3.26 | 0.122 | 0.028 | 385 | 1625 | 118 |
| Example 2 | 66.5 | 7.13 | 0.277 | 0.048 | 240 | 1382 | 148 |
| Example 3 | 56.5 | 6.51 | 0.406 | 0.163 | 139 | 348 | 52 |
| Example 4 | 54.4 | 11.6 | 0.495 | 0.174 | 110 | 312 | 66 |
| Example 5 | 35.3 | 4.30 | 0.189 | 0.086 | 187 | 412 | 50 |
| Example 6 | 47.0 | 16.4 | 0.386 | 0.131 | 121 | 359 | 125 |
| Example 7 | 50.3 | 3.52 | 0.150 | 0.032 | 335 | 1554 | 109 |
| Example 8 | 62.0 | 0.904 | 0.028 | 0.0021 | 2213 | 29940 | 437 |
| Example 9 | 80.9 | 2.68 | 0.091 | 0.011 | 692 | 7426 | 246 |
| Example 10 | 95.0 | 8.53 | 0.320 | 0.050 | 296 | 1886 | 169 |
| Example 11 | 65.5 | 1.14 | 0.037 | 0.0045 | 1764 | 14530 | 254 |
| Example 12 | 148 | 23.0 | 1.02 | 0.254 | 146 | 584 | 90 |
| Example 13 | 57.1 | 6.05 | 0.265 | 0.108 | 215 | 528 | 56 |
| Example 14 | 60.5 | 0.869 | 0.028 | 0.0046 | 2196 | 13160 | 189 |
| Comparative Example 1 | 171 | 52.1 | 2.59 | 1.31 | 66 | 130 | 40 |
| Comparative Example 2 | 192 | 76.1 | 3.98 | 1.86 | 48 | 104 | 41 |

INDUSTRIAL APPLICABILITY

The hollow fiber carbon membrane produced by the production method of the present invention can be used in the fields of hydrogen production, separation and collection of carbon dioxide, separation and collection of exhaust gas, natural gas separation, gas dehumidification, alcohol dehydration apparatus, production of oxygen from air, and the like.

REFERENCE SIGNS LIST

1 separation membrane module
2 container
3 separation membrane element
4 gas supply port
5, 6 gas discharge port
8 first space
9 second space

The invention claimed is:

1. A method of producing a hollow fiber carbon membrane, the method comprising:
   a preparation step of preparing a precursor made of an organic polymer compound in the form of a hollow fiber;
   a preheating step of heating the precursor to a temperature of 150° C. to 400° C. in an atmosphere containing an oxygen gas; and
   a carbonization step of heating the precursor which has been subjected to the preheating step to a temperature of 450° C. to 850° C., thereby carbonizing the precursor;
   wherein the carbonization step comprises heating the precursor in the presence of a hydrocarbon gas which may contain a nitrogen atom and which has from 1 to 8 carbon atoms, and the hydrocarbon gas is supplied from an external source.

2. The method of producing a hollow fiber carbon membrane according to claim 1, wherein the hydrocarbon gas is a hydrocarbon containing a carbon-carbon unsaturated bond.

3. The method of producing a hollow fiber carbon membrane according to claim 1, wherein the organic polymer compound comprises at least one selected from the group consisting of polyphenylene oxide, and a polyphenylene oxide derivative containing structures represented by the following formulae (a) and (b):

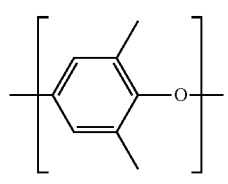

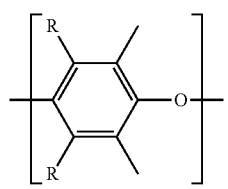

wherein in the formula (b), each R independently represents a hydrogen atom, —SO₃H, or —SO₃NH₄, with the proviso that the Rs are not simultaneously hydrogen atoms.

4. A separation membrane module comprising a hollow fiber carbon membrane produced by the method of producing a hollow fiber carbon membrane according to claim 1.

5. The method of producing a hollow fiber carbon membrane according to claim 2, wherein the organic polymer compound comprises at least one selected from the group consisting of polyphenylene oxide, and a polyphenylene oxide derivative containing structures represented by the following formulae (a) and (b):

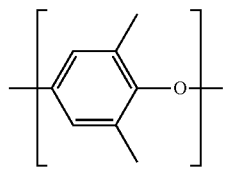

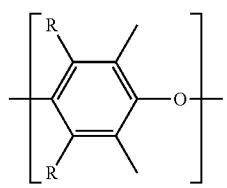

wherein in the formula (b), each R independently represents a hydrogen atom, —SO₃H, or —SO₃NH₄, with the proviso that the Rs are not simultaneously hydrogen atoms.

6. A separation membrane module comprising a hollow fiber carbon membrane produced by the method of producing a hollow fiber carbon membrane according to claim 2.

7. A separation membrane module comprising a hollow fiber carbon membrane produced by the method of producing a hollow fiber carbon membrane according to claim 3.

8. A separation membrane module comprising a hollow fiber carbon membrane produced by the method of producing a hollow fiber carbon membrane according to claim 5.

9. The method of producing a hollow fiber carbon membrane according to claim 1, wherein the carbonization step further comprises supplying an inert gas and the hydrocarbon gas simultaneously, and the concentration of the hydrocarbon gas (volume flow rate of hydrocarbon gas/volume flow rate of inert gas×100[% by volume]) is 5% by volume or more, and 50% by volume or less.

10. The method of producing a hollow fiber carbon membrane according to claim 1, further comprising elevating a temperature within a reactor while supplying an inert gas in the absence of the hydrocarbon gas before starting the carbonization step.

11. The method of producing a hollow fiber carbon membrane according to claim 1, wherein the hydrocarbon gas has from 1 to 4 carbon atoms.

12. The method of producing a hollow fiber carbon membrane according to claim 2, wherein the carbonization step further comprises supplying an inert gas and the hydrocarbon gas simultaneously, and the concentration of the hydrocarbon gas (volume flow rate of hydrocarbon gas/volume flow rate of inert gas×100[% by volume]) is 5% by volume or more, and 50% by volume or less.

13. The method of producing a hollow fiber carbon membrane according to claim 2, further comprising elevating a temperature within a reactor while supplying an inert gas in the absence of the hydrocarbon gas before starting the carbonization step.

14. The method of producing a hollow fiber carbon membrane according to claim 2, wherein the hydrocarbon gas has from 1 to 4 carbon atoms.

15. The method of producing a hollow fiber carbon membrane according to claim 3, wherein the carbonization step further comprises supplying an inert gas and the hydrocarbon gas simultaneously, and the concentration of the hydrocarbon gas (volume flow rate of hydrocarbon gas/volume flow rate of inert gas×100[% by volume]) is 5% by volume or more, and 50% by volume or less.

16. The method of producing a hollow fiber carbon membrane according to claim 3, further comprising elevating a temperature within a reactor while supplying an inert gas in the absence of the hydrocarbon gas before starting the carbonization step.

17. The method of producing a hollow fiber carbon membrane according to claim 3, wherein the hydrocarbon gas has from 1 to 4 carbon atoms.

18. The method of producing a hollow fiber carbon membrane according to claim 4, wherein the carbonization step further comprises supplying an inert gas and the hydrocarbon gas simultaneously, and the concentration of the hydrocarbon gas (volume flow rate of hydrocarbon gas/volume flow rate of inert gas×100[% by volume]) is 5% by volume or more, and 50% by volume or less.

19. The method of producing a hollow fiber carbon membrane according to claim 4, further comprising elevating a temperature within a reactor while supplying an inert gas in the absence of the hydrocarbon gas before starting the carbonization step.

20. The method of producing a hollow fiber carbon membrane according to claim 4, wherein the hydrocarbon gas has from 1 to 4 carbon atoms.

* * * * *